(12) United States Patent
Peterson

(10) Patent No.: US 7,401,508 B1
(45) Date of Patent: Jul. 22, 2008

(54) ILLUMINATED RAIN GAUGE

(76) Inventor: George W. Peterson, 9235 Pioneer Ct., Lincoln, NE (US) 68520

( * ) Notice: Subject to any disclaimer, the term of this patent is extended or adjusted under 35 U.S.C. 154(b) by 4 days.

(21) Appl. No.: 11/643,365

(22) Filed: Dec. 21, 2006

Related U.S. Application Data

(63) Continuation-in-part of application No. 10/975,300, filed on Oct. 28, 2004, now Pat. No. 7,152,468.

(51) Int. Cl.
*G01W 1/00* (2006.01)
*G01F 23/00* (2006.01)
(52) U.S. Cl. ............... 73/170.17; 116/227; 116/228
(58) Field of Classification Search ........... 73/170.17; 116/227, 228
See application file for complete search history.

(56) References Cited

U.S. PATENT DOCUMENTS

| | | | | |
|---|---|---|---|---|
| 4,587,845 A * | 5/1986 | Varga | ............................ | 73/325 |
| 5,038,606 A * | 8/1991 | Geschwender et al. | ... | 73/170.17 |
| 5,138,301 A * | 8/1992 | Delahaye | ..................... | 340/607 |
| 5,571,963 A * | 11/1996 | Balchin et al. | ........... | 73/170.21 |
| 5,782,552 A * | 7/1998 | Green et al. | ................. | 362/183 |
| 6,013,985 A * | 1/2000 | Green et al. | ................. | 315/149 |
| 6,120,165 A * | 9/2000 | Shalvi | ......................... | 362/276 |
| 6,363,781 B1 * | 4/2002 | Moore | ...................... | 73/170.17 |
| 6,832,166 B2 * | 12/2004 | Schutzbach | .................. | 702/50 |

* cited by examiner

*Primary Examiner*—Edward Lefkowitz
*Assistant Examiner*—Jermaine Jenkins
(74) *Attorney, Agent, or Firm*—Thomte Patent Law Office; Dennis L. Thomte

(57) ABSTRACT

An illuminated rain gauge comprising an elongated, transparent collection vessel or tube having upper and lower ends with the lower end thereof being closed by a plug and which has a funnel-shaped collector at the upper end thereof. The plug has a battery compartment formed therein for receiving a DC battery power source. A pair of LEDs are operatively connected to the battery power source and are positioned on the plug so as to direct light upwardly therefrom to illuminate the rain gauge. The electronic circuitry of the gauge is positioned within the plug and is controlled by a remote IF control device which signals an IF receiver positioned on the plug. The LEDs direct light onto the collection vessel so that the rainfall amounts may be determined during periods of darkness.

10 Claims, 5 Drawing Sheets

ILLUMINATED RAIN GAUGE

CROSS-REFERENCE TO RELATED APPLICATION

This is a continuation-in-part application of Petitioner's earlier application Ser. No. 10/975,300 filed Oct. 28, 2004 now U.S. Pat. No. 7,152,468, entitled "ILLUMINATED RAIN GAUGE".

BACKGROUND OF THE INVENTION

1. Field of the Invention

This invention relates to a rain gauge and more particularly to an illuminated rain gauge to facilitate the observation of the same during periods of darkness.

2. Description of the Related Art

Many rain gauges have been previously provided and come in various shapes and forms. Further, many efforts have been made to facilitate the reading of the rainfall indicia on the rain gauges. For example, U.S. Pat. No. 5,038,606 discloses a "jumbo" rain gauge wherein the indicia thereon is enlarged so that the rainfall amount may be read from a distance. Although the rain gauge of the above-identified patent and other rain gauges of the prior art do enhance the readability of the indicia on the rainfall collection vessel, it is difficult, if not impossible, to read the same or observe the rainfall level within the collection vessel during periods of darkness.

An improved rain gauge is described in my patent application Ser. No. 10/975,300 filed Oct. 28, 2004, entitled "ILLUMINATED RAIN GAUGE". In my co-pending application, means is shown to illuminate the rain gauge during periods of darkness by remote control. Although the rain gauge shown and described in my co-pending application represents an improvement in the rain gauge art, it is believed that the illuminated rain gauge of this invention represents a further improvement in the rain gauge art.

SUMMARY OF THE INVENTION

An illuminated rain gauge is disclosed comprising a transparent rain collecting vessel having indicia and a float associated therewith. The upper end of the vessel is open for collecting rainfall. The lower end of the vessel is closed by a plug which is preferably constructed of polyethylene with UV stabilizers. The upper end of the plug is received by the lower end of the vessel. The plug has a battery compartment formed therein for receiving a DC battery power source therein. A pair of spaced-apart LEDs are positioned on the plug and are positioned so as to direct light upwardly from the plug onto the vessel to illuminate the same. An electronic control circuit is provided in the plug and includes a switch which is "instant on" and "time delay off". The circuit also includes an IF receiver adapted to receive a signal from a common television or similar remote control device utilizing infrared technology. The LEDs are turned on by way of the signal from the remote control and will automatically turn off as determined by the fixed time-delay within the circuit.

It is therefore a principal object of the invention to provide an illuminated rain gauge.

Yet another object of the invention is to provide an illuminated rain gauge wherein the lower end thereof is closed by a plug containing a DC battery or batteries and an electronic circuit which controls the operation of a pair of LEDs positioned on the plug and which directs light upwardly therefrom to illuminate the rain gauge so that the level of rainfall in the collection vessel may be observed and measured.

Still another object of the invention is to provide an illuminated rain gauge is illuminated by means of a remote control device.

Yet another object of the invention is to provide an illuminated rain gauge which is economical of manufacture, durable in use and refined in appearance.

These and other objects will be apparent to those skilled in the art.

DETAILED DESCRIPTION OF THE INVENTION

Figure 1:
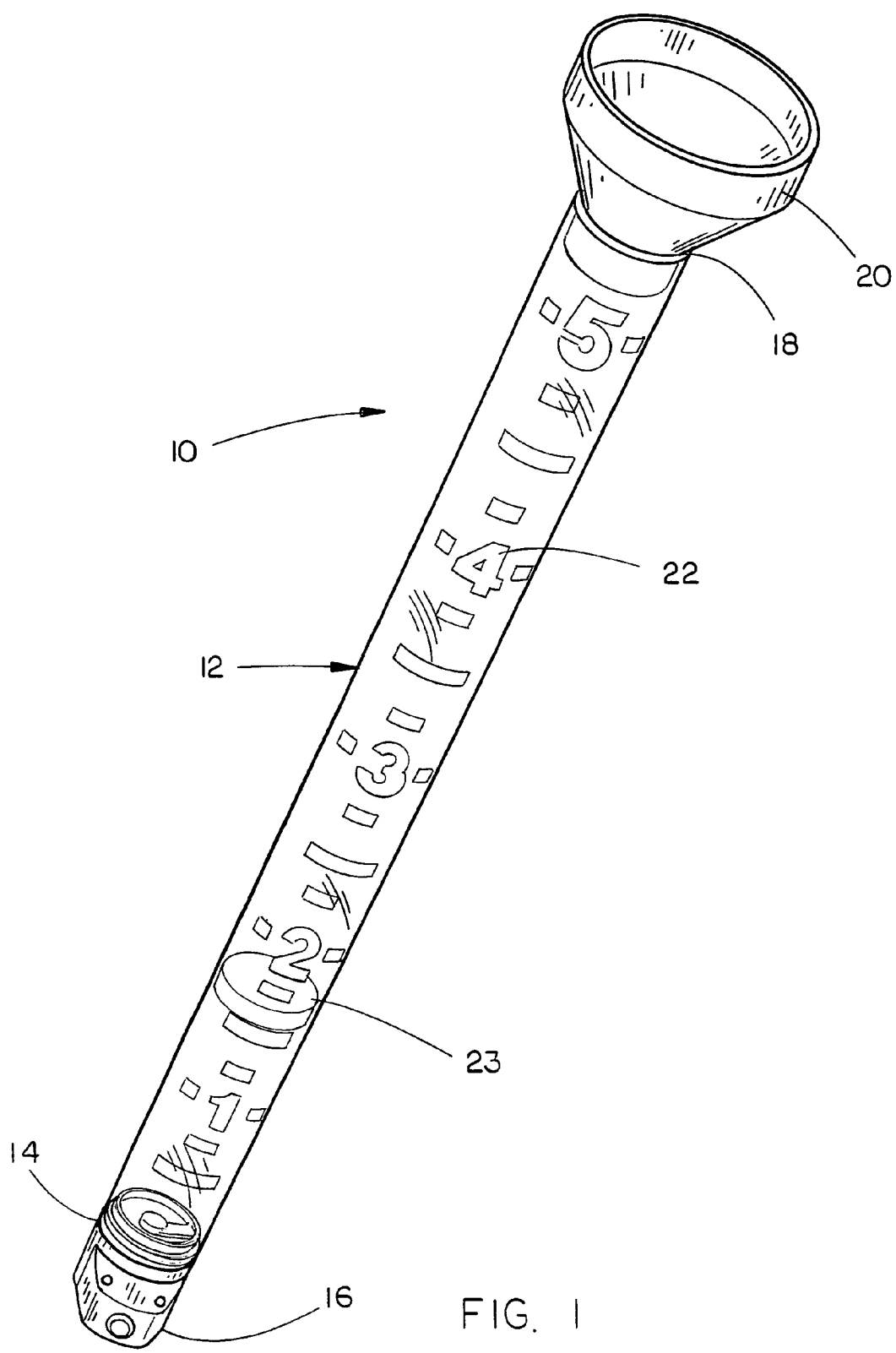
FIG. 1 is a perspective view of the illuminated rain gauge of this invention.
Figure 2:
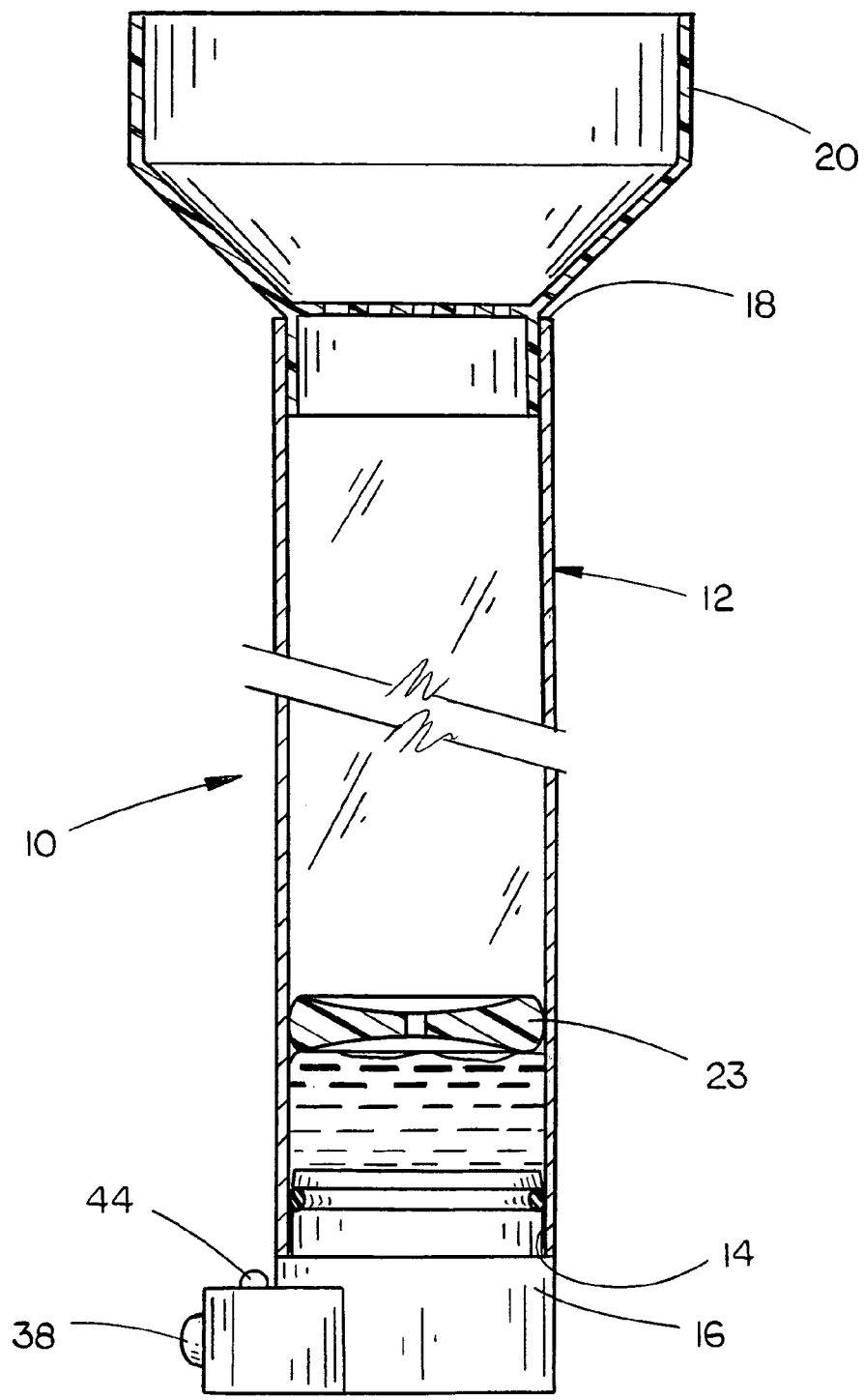
FIG. 2 is a partial sectional view of the rain gauge of FIG. 1.
Figure 3:
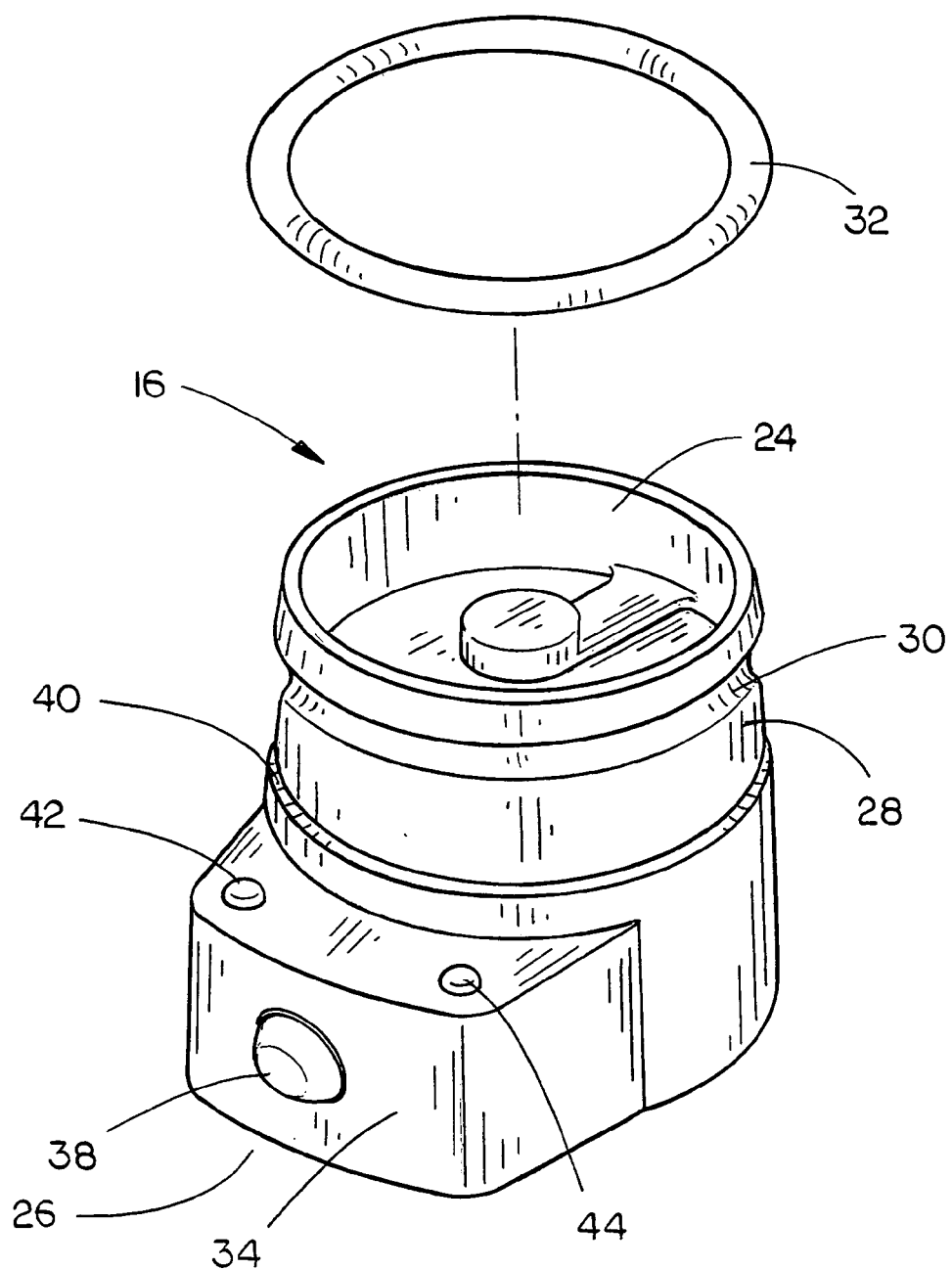
FIG. 3 is a perspective view of the plug which closes the lower end of the collection vessel.
Figure 4:
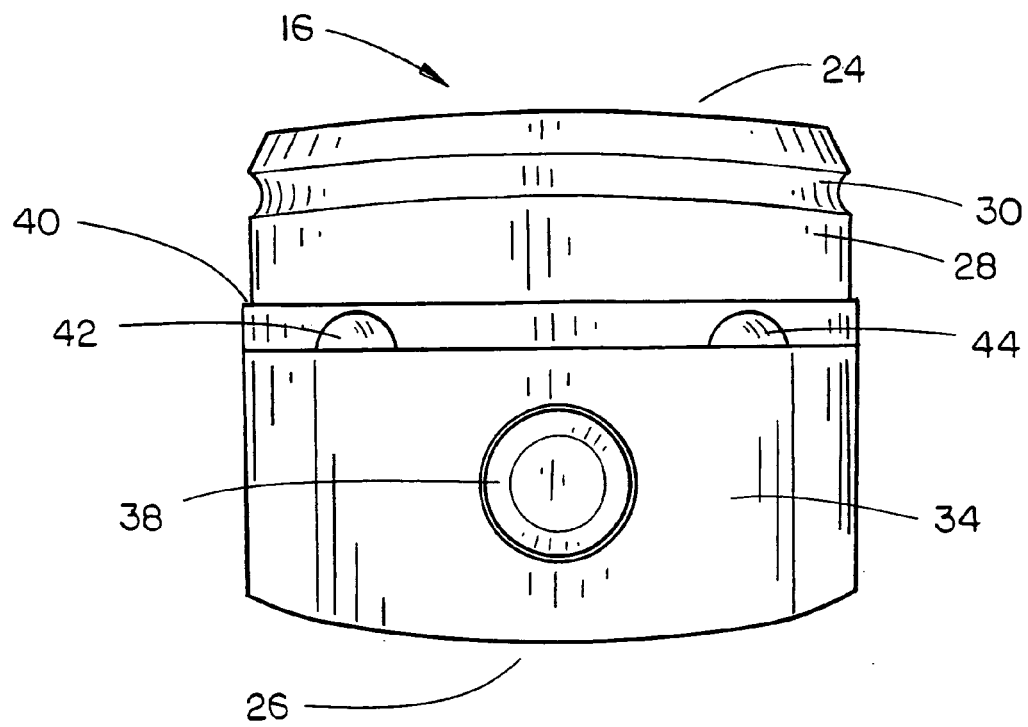
FIG. 4 is a front view of the plug of FIG. 3.
Figure 5:
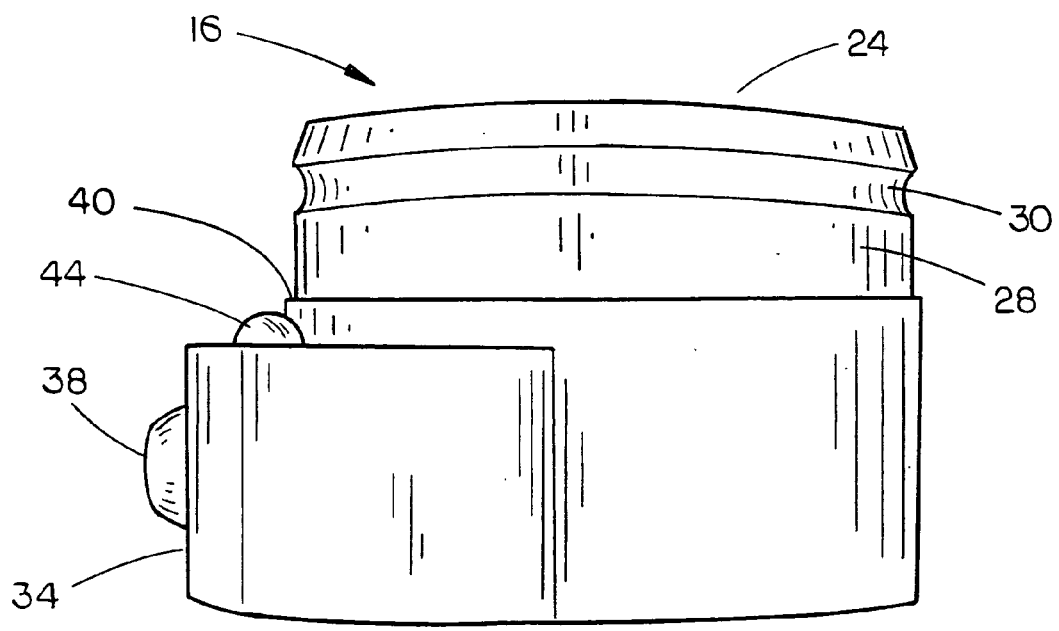
FIG. 5 is a side view of the plug of FIG. 3.
Figure 6:
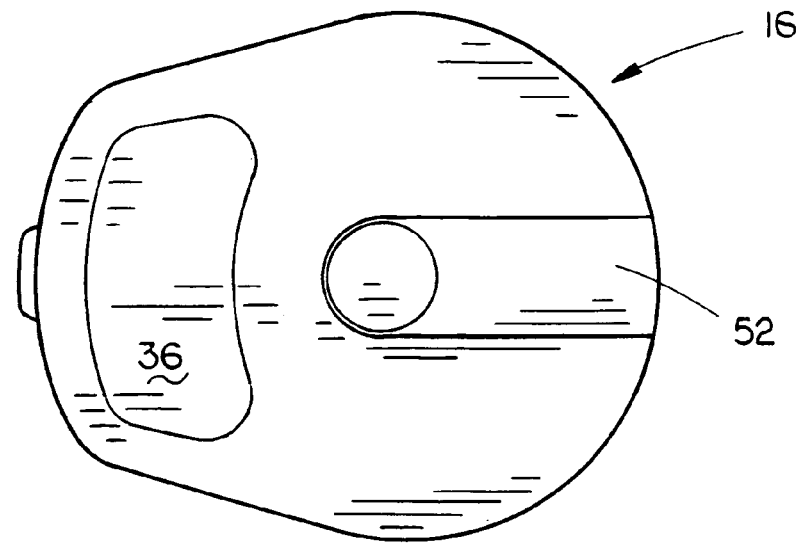
FIG. 6 is a bottom view of the plug of FIG. 3.

The illuminated rain gauge of this invention is referred to generally by the reference numeral 10 and is similar to the rain gauge disclosed in applicant's co-pending application. The illumination means of this invention is designed to be used on the lower end of a large tubular or cylindrical rain gauge, sometimes referred to as a "Jumbo" rain gauge, although the illumination means of the invention may be used on smaller rain gauges.

Rain gauge 10 includes an elongated hollow collection vessel 12 which is preferably constructed of a transparent plastic material. Collection vessel 12 includes an open lower end 14 which is closed by a plug 16. Vessel 12 also includes an upper open end 18 having a funnel-shaped collector 20 mounted therein. The vessel 12 is provided with printed measurement indicia 22 thereon, as seen in the drawings, as well as a float 23.

Plug 16 is preferably constructed of a plastic material such as polyethylene with UV stabilizers. For purposes of description, plug 16 will be described as having an upper end 24 and a lower end 26. Plug 16 includes a cylindrical or tubular upper end portion 28 which is received within the open lower end of vessel 12 to close the lower end of the vessel 12. Preferably, upper end portion 28 has an annular recess 30 formed therein which receives an O-ring 32 to prevent water in the vessel from leaking therefrom. The exterior surface of upper end portion 28 could also have one or more protruding, annular ridges formed thereon which sealably engage the inside surface of vessel 12. Plug 16 includes an extension or extension portion 34 extending outwardly therefrom which has a battery compartment therein, the lower end of which is selectively closed by a cover or plate 36 to permit access to the compartment. The front of the extension 34 has an IF receiver 38 therein adapted to receive a signal from a conventional television or other remote control device utilizing infrared technology.

Plug 16 is provided with an annular shoulder 40 which supports the lower end of the vessel 12 thereon. A pair of high intensity LEDs 42 and 44 are positioned on a ledge 46 defined by the upper end of extension 34 and are designed to direct light upwardly therefrom to illuminate the rain gauge 10 so that the indicia 22 is visible and so that the float 23 is visible during times of darkness. If desired, a lens may be associated with each of the LEDs 42 and 44. Although it is preferred that LEDs be utilized as the illumination means, other light emitters or sources may be used. Further, any number of LEDs or light sources may be used.

Figure 7:
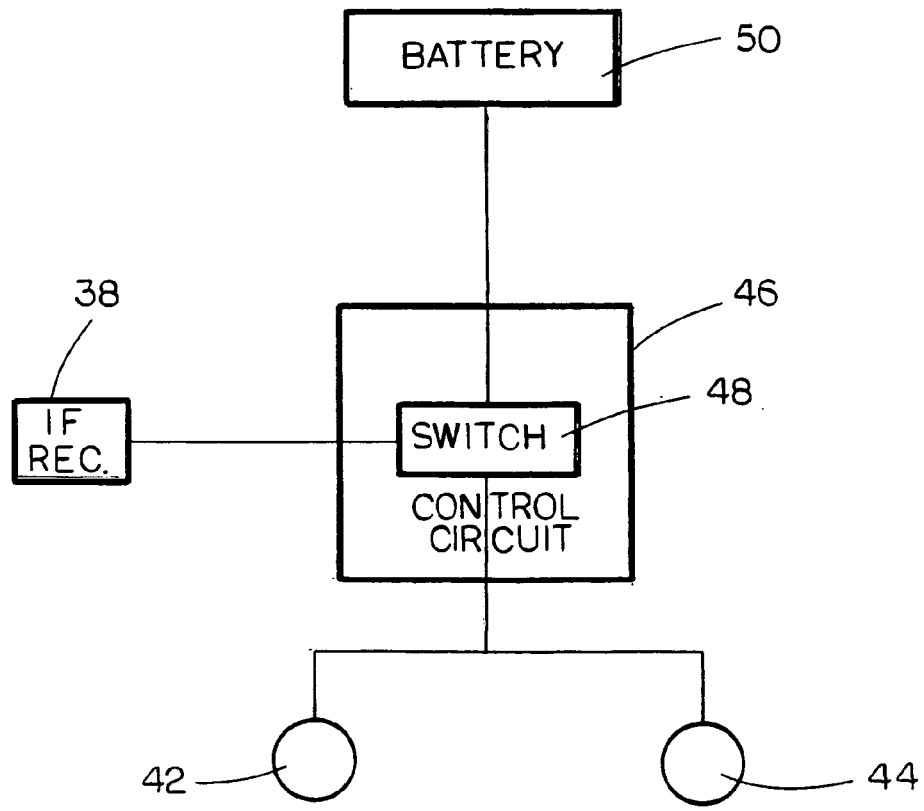
FIG. 7 is a schematic of the circuitry of the rain gauge.

As illustrated in FIG. 7, the IF receiver 38 is a component of the electronic control circuit 46. Circuit 46 includes an electronic switch 48 which is imposed between the DC battery power source 50 preferably in the form of "button" batteries. Switch 48 is preferably of the "instant on" and time delay off type but may be "instant on" and "instant off" as controlled by the remote control device which sends signals to the IF receiver 38. Preferably, the remote control device is actuated by the user of the rain gauge to actuate switch 48 to illuminate the LEDs 42 and 44. After a predetermined time delay, the switch 48 is automatically opened to deactivate or turn off the LEDs 42 and 44.

The rain gauge 10 may be supported in a vertical orientation by any convenient means. In the case shown, the bottom of the plug 16 is provided with an elongated slot 52 formed therein for receiving a mounting bracket (not shown) therein.

It can therefore be seen that the illuminated rain gauge of this invention accomplishes at least all of its stated objectives.

I claim:

1. An illuminated rain gauge, comprising:
   an upstanding transparent rain collecting vessel having indicia associated therewith;
   said vessel having an open upper end for collecting rainfall;
   said vessel having an open lower end;
   a plug having upper and lower ends;
   said upper end of said plug being received by said open lower end of said tube to close said open lower end;
   said plug including a DC battery storage area therein;
   a DC battery means in said DC battery storage area;
   at least one light emitter positioned on said plug which directs light upwardly therefrom to illuminate said vessel;
   an electrical circuit in said plug which electrically connects said DC battery and said at least one light emitter;
   said electrical circuit capable of activating and deactivating said at least one light emitter;
   said electrical circuit including an infrared receiver in said plug capable of receiving remote signals so that said at least one light emitter may be remotely activated.

2. The illuminated rain gauge of claim 1 further including a float, said at least one light emitter also illuminating said float.

3. The illuminated rain gauge of claim 1 wherein a pair of horizontally spaced-apart light emitters are positioned on said plug.

4. The illuminated rain gauge of claim 3 wherein said emitters are light emitting diodes.

5. The illuminated rain gauge of claim 3 wherein said light emitters are positioned below said lower end of said vessel.

6. The illuminated rain gauge of claim 1 wherein said light emitter comprises a light emitting diode.

7. The illuminated rain gauge of claim 1 wherein said plug includes a ledge formed therein which supports said lower end of said vessel.

8. The illuminated rain gauge of claim 1 wherein said electrical circuit includes a time-delay means which deactivates said light emitter after a predetermined length of time after said light emitter has been activated.

9. The illuminated rain gauge of claim 1 wherein said at least one light emitter is positioned below said lower end of said vessel.

10. The illuminated rain gauge of claim 9 wherein said light emitting diodes are high intensity light emitting diodes.

\* \* \* \* \*